US009216646B2

(12) United States Patent
Yang et al.

(10) Patent No.: US 9,216,646 B2
(45) Date of Patent: Dec. 22, 2015

(54) FUEL SYSTEM CONTROL (71) Applicant: Ford Global Technologies, LLC, Dearborn, MI (US)

(72) Inventors: Dennis Seung-Man Yang, Canton, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 262 days.

(21) Appl. No.: 13/922,059

(22) Filed: Jun. 19, 2013

(65) Prior Publication Data

US 2014/0374177 A1  Dec. 25, 2014

(51) Int. Cl.
| G01M 17/00 | (2006.01) |
| B60K 15/035 | (2006.01) |
| F02M 25/08 | (2006.01) |
| B60K 6/22 | (2007.10) |

(52) U.S. Cl.
CPC .............. B60K 15/035 (2013.01); B60K 6/22 (2013.01); F02M 25/0836 (2013.01); B60K 2015/03561 (2013.01); B60Y 2200/92 (2013.01); Y10S 903/904 (2013.01); Y10T 137/0396 (2015.04)

(58) Field of Classification Search
CPC ............ F02D 41/0032; F02D 2200/0606; F02M 25/0836; F02M 25/0809
USPC ............... 701/30.7, 34.4, 22, 32.3, 101, 104; 123/495, 506; 180/65.21
See application file for complete search history.

(56) References Cited

U.S. PATENT DOCUMENTS

| 7,506,639 | B2 * | 3/2009 | Saito .............................. 123/520 |
| 7,753,035 | B2 | 7/2010 | Collet |
| 7,957,888 | B2 * | 6/2011 | Leone et al. ................... 701/103 |
| 8,434,461 | B2 * | 5/2013 | Kerns et al. .................... 123/521 |
| 8,551,214 | B2 * | 10/2013 | Dudar et al. ....................... 95/19 |
| 2007/0101973 | A1 | 5/2007 | Wolber et al. |
| 2011/0197862 | A1 | 8/2011 | Der Manuelian et al. |
| 2011/0265768 | A1 * | 11/2011 | Kerns et al. .................... 123/521 |

FOREIGN PATENT DOCUMENTS

| JP | 3329952 B2 | 9/2002 |
| JP | 2004162700 A | 6/2004 |

OTHER PUBLICATIONS

Haladyna, Ted et al., "Method and System for Oil Dilution Control," U.S. Appl. No. 13/647,990, filed Oct. 9, 2012, 47 pages.
Jentz, Robert Roy et al., "Fuel System Control," U.S. Appl. No. 13/773,461, filed Feb. 21, 2013, 33 pages.

* cited by examiner

Primary Examiner — Gertrude Arthur Jeanglaude
(74) Attorney, Agent, or Firm — James Dottavio; Alleman Hall McCoy Russell & Tuttle LLP (57) ABSTRACT Methods and systems are provided for accurately confirming fuel tank depressurization before unlocking a fuel door to enable refueling. Following a refueling request, a fuel system may be sealed from the atmosphere while one or more fuel system valves are adjusted to divert fuel tank pressure or vacuum to an engine intake. Depressurization may be inferred based on the presence of air or vapor flow into the intake as sensed by a manifold airflow sensor.

20 Claims, 4 Drawing Sheets

FUEL SYSTEM CONTROL

FIELD

The present description relates to systems and methods for inferring fuel system depressurization in a hybrid vehicle.

BACKGROUND AND SUMMARY

Hybrid vehicle fuel systems may include a sealed fuel tank configured to withstand high fuel tank pressure and vacuum levels. Fuel tank pressure or vacuum levels may build up due to engine operating conditions as well as the generation of diurnal vapors over vehicle drive cycles. During refueling of a fuel tank, a fuel door may be maintained locked until sufficient depressurization has occurred to disable refueling of a pressurized fuel tank. A fuel tank pressure sensor may be used to determine if there is excess pressure or vacuum build-up in the fuel tank, and if depressurization is required. During the depressurization, fuel tank vapors may be released into and stored in a fuel vapor canister packed with an adsorbent by opening a valve coupled between the fuel tank and the canister. At a later time, when the engine is in operation, the stored vapors can be purged into the engine intake manifold for use as fuel.

One example approach for verifying fuel tank depressurization is shown by Wolber et al. in US 2007/0101973. Therein, a fuel system pressure is inferred based on engine conditions when an engine is turned off relative to engine conditions when the engine is started during a subsequent driving cycle. For example, based on a difference between a shut-down fuel system temperature and a starting fuel system temperature, a depressurized fuel system may be inferred. In addition, the fuel tank pressure sensor may be diagnosed based on the fuel system temperature change.

However, the inventors herein have recognized potential issues with such systems. As one example, in hybrid vehicles have drastically reduced engine running times (such as PHEVs), fuel system temperatures may not vary enough to correctly infer fuel tank depressurization. If the fuel system pressure sensor is degraded, the fuel tank temperature may not be reliably used to determine if sufficient depressurization has occurred. If depressurization is not correctly determined, the fuel door may remain locked and the operator may not be able to refill the fuel tank. Alternatively, the operator may get showered with fuel mist if the fuel door is opened prematurely.

In one example, some of the above issues may be addressed by a method for a fuel system coupled in a hybrid vehicle. The method may comprise, during refueling conditions, directing fuel tank vapors to an engine intake manifold, and indicating depressurization of a fuel tank based on an output of a mass air flow sensor coupled to the intake manifold. In this way, depressurization may be reliably determined even if a fuel tank pressure sensor goes bad.

For example, an operator may indicate a refueling request by actuating a refueling button on a dashboard of a hybrid vehicle. In response to the refueling request, a fuel tank pressure may be estimated by a fuel tank pressure sensor. If the estimated fuel tank pressure (or vacuum) is above a threshold, depressurization may be required prior to unlocking a fuel door and enabling refueling. As a backup method, to compensate for any malfunction of the fuel tank pressure sensor (e.g., the sensor being degraded or stuck in range), fuel tank depressurization may be inferred from manifold flow. Specifically, in response to the refueling request, the fuel system may be sealed by closing a canister vent valve (CVV) coupling a fuel system canister to the atmosphere) while a fuel tank isolation valve (FTIV) coupling the fuel tank to the fuel system canister, and a canister purge valve (CPV) coupling the canister to an engine intake manifold are opened to relieve the elevated fuel tank pressure. An intake throttle valve may also be commanded open. Due to the specific valve adjustments, the only path for tank pressure (or vacuum) relief is through the CPV into the engine intake. If there is any tank pressure or vacuum to relieve, an air or vapor flow will occur through the engine intake which may be detected by an intake manifold mass air flow (MAF) sensor. Therefore, in response to an output from the MAF sensor (e.g, an output that is higher than a threshold, or any output), it may be inferred that fuel tank depressurization is ongoing and a fuel door may be maintained locked. As such, fuel tank vapors may continue to be diverted to the engine intake until the fuel tank has completely depressurized to ambient pressure conditions (e.g., to barometric pressure conditions). In response to the output from the MAF sensor being lower than the threshold, or when the MAF sensor stops responding, it may be inferred that fuel tank depressurization is complete and that it is safe to refuel. At this time, the fuel door may be unlocked and the vehicle operator may be able to refill the tank from an external fuel source.

In some embodiments, degradation of the fuel tank pressure sensor may also be determined based on discrepancies between the output of the fuel tank pressure sensor and the MAF sensor. For example, during refueling conditions when an output of the fuel tank pressure sensor is lower than a threshold, indicating absence of excess fuel tank pressure, but the output of the MAF sensor is higher than a threshold, indicating depressurization flow of fuel tank vapors to the engine intake, it may be determined that the fuel tank pressure sensor is degraded and a diagnostic code may be set.

In this way, an auxiliary method is provided for verifying fuel tank depressurization during refueling. By diverting excess fuel tank pressure or vacuum to an engine intake, tank depressurization may be inferred based on flow of air or vapors from the sealed fuel tank to the engine intake. By using an existing MAF sensor to detect the flow, the need for additional hardware for detecting depressurization is reduced. By relying on the output of a fuel tank pressure sensor and a MAF sensor to detect depressurization, the reliability of the results is improved. In addition, depressurization can be accurately identified using the MAF sensor even when the fuel tank pressure sensor is degraded. By holding the fuel door locked until fuel tank depressurization is confirmed, the vehicle operator may be protected from fuel spray. In addition, evaporative hydrocarbon emissions (or leakage) is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
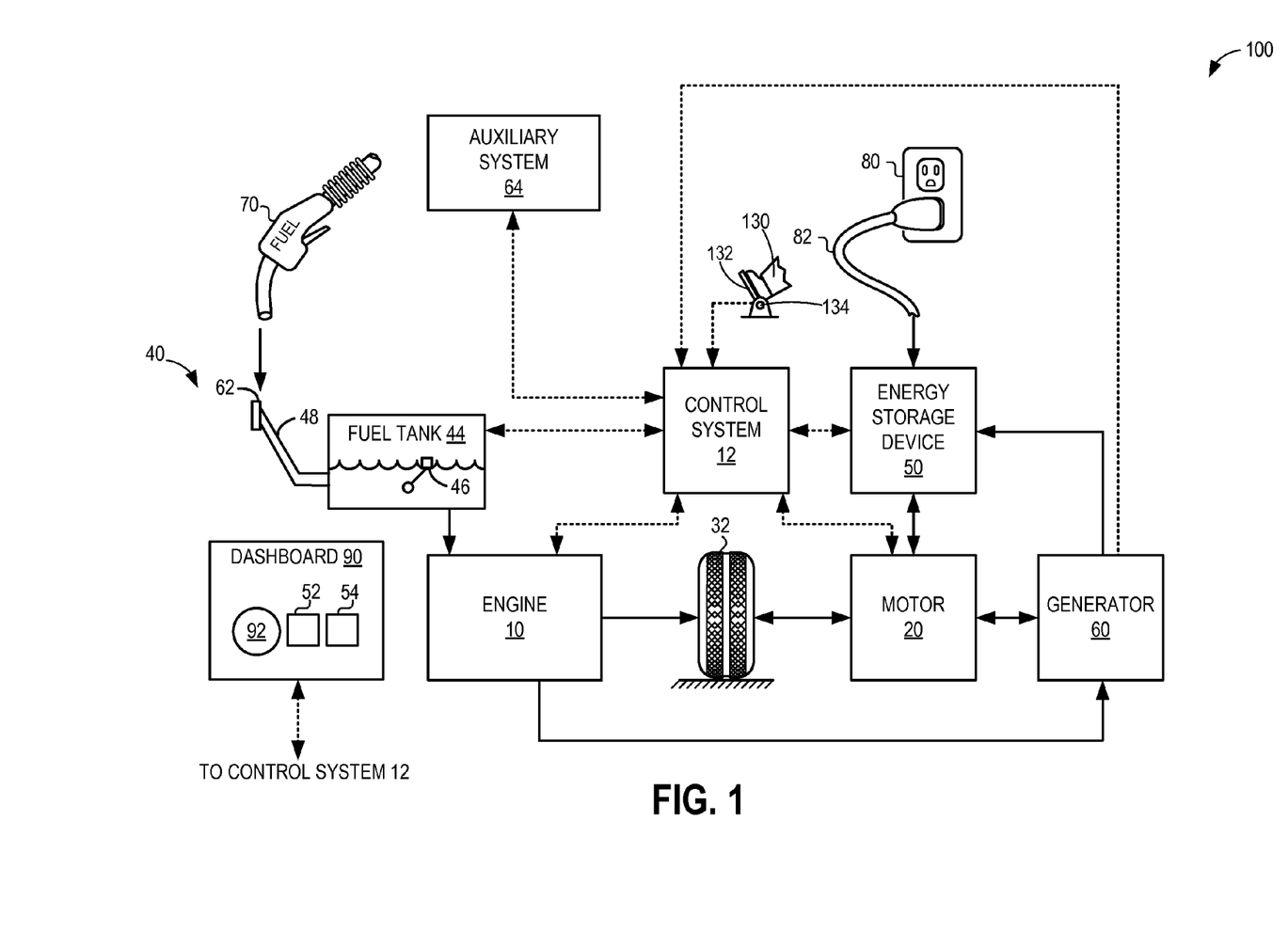
FIG. 1 illustrates an example hybrid vehicle system.
Figure 3:
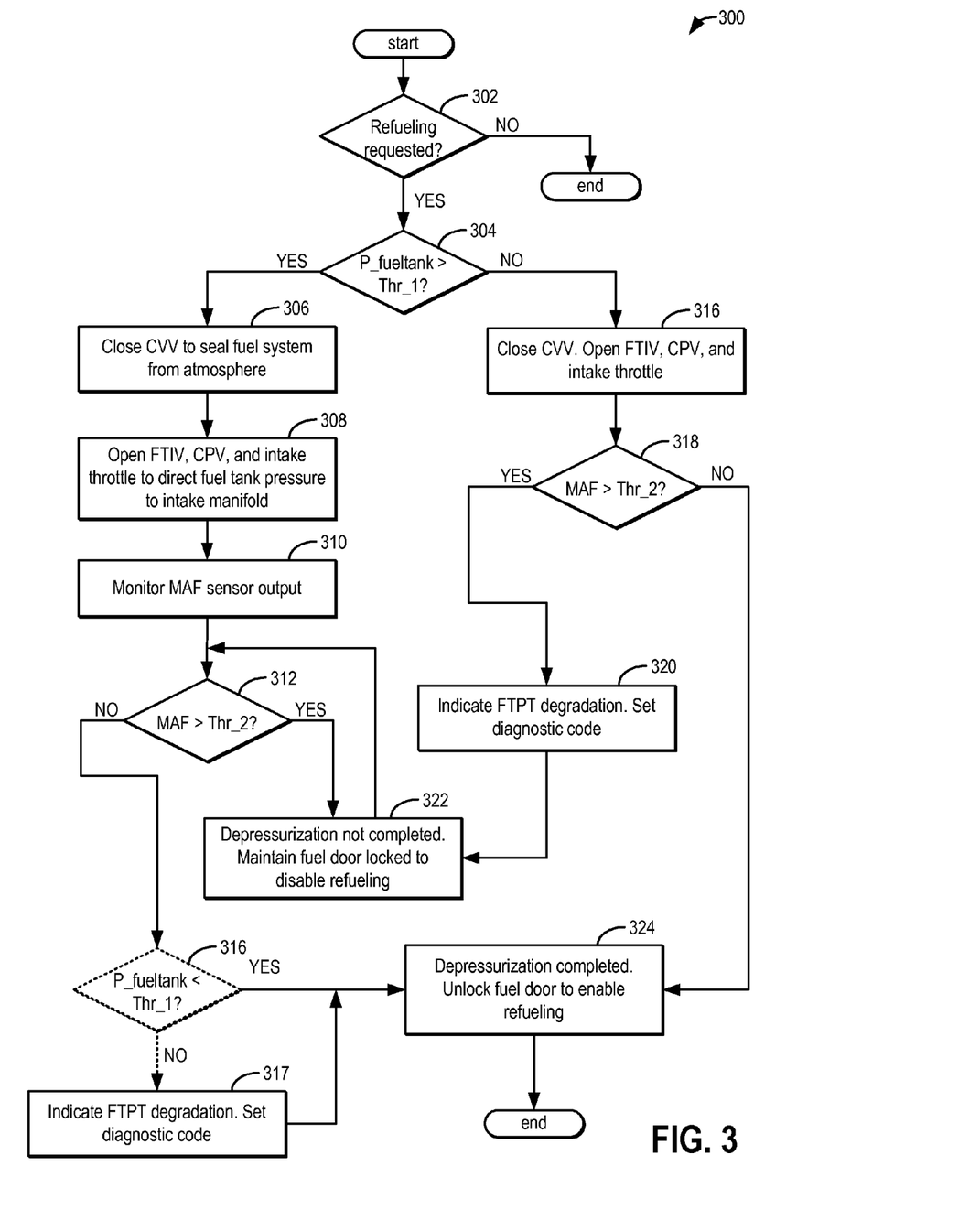
FIG. 3 illustrates a high level flow chart illustrating a routine for verifying fuel tank depressurization during a fuel tank refueling operation.
Figure 4:
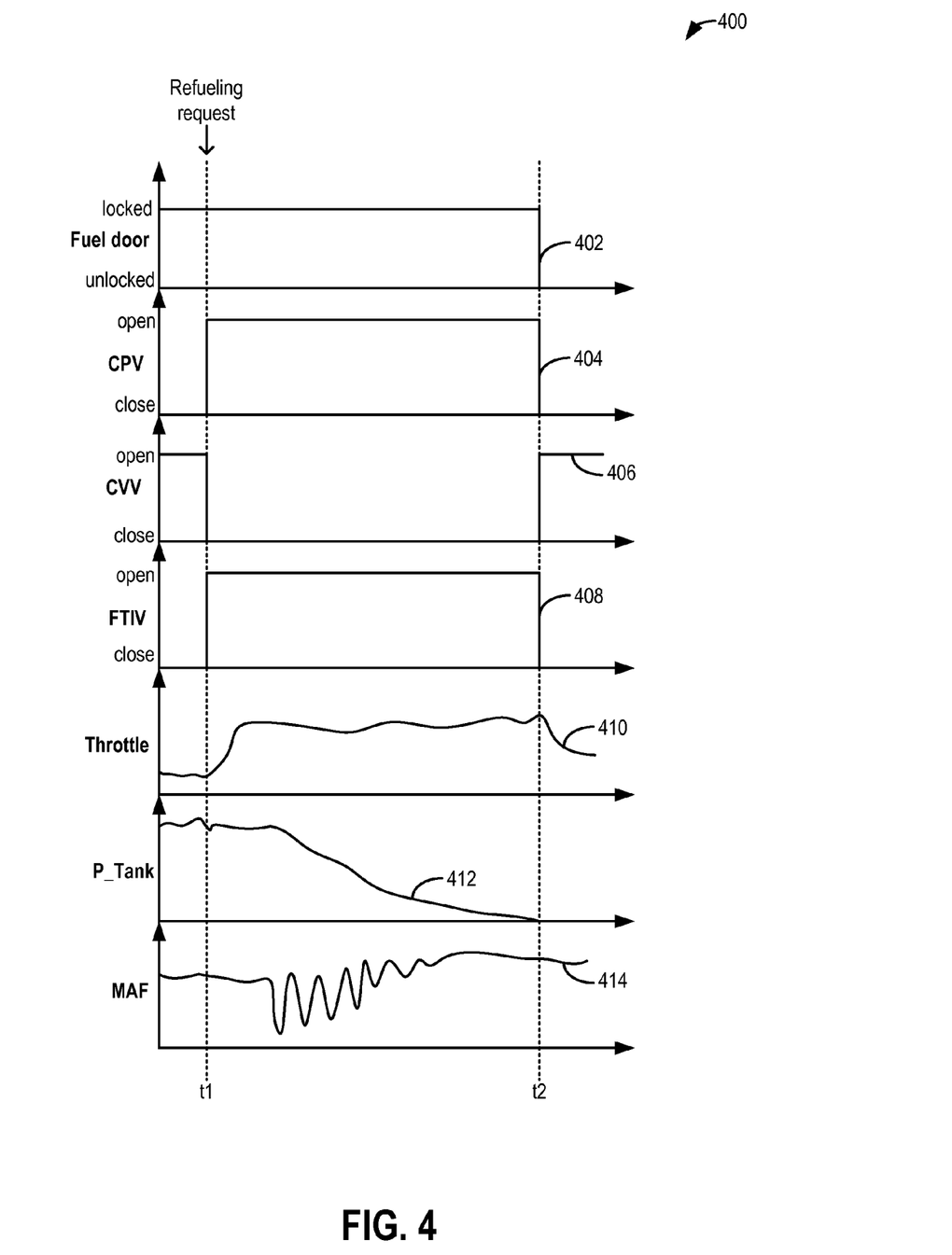
FIG. 4 illustrates an example refueling operation.

The following description relates to systems and methods for operating a hybrid electric vehicle, such as the plug-in hybrid electric vehicle of FIG. 1. In response to a refueling request from a vehicle operator, an engine fuel system (such as the fuel system of FIG. 2) may be sealed and excess fuel tank pressure/vacuum may be relieved in to an engine intake manifold. A controller may be configured to perform a routine, such as shown in FIG. 3, to infer fuel tank depressurization by sensing the flow of air or vapors from the fuel tank to the intake manifold at an intake MAF sensor. During the depressurization, a fuel door may be held locked. When the MAF sensor stops responding, fuel tank depressurization may be determined to be complete and the fuel door may be unlocked enabling the vehicle operator to refill the fuel tank. An example refueling operation is shown at FIG. 4. In this way, fuel tank over-pressure conditions may be reliably inferred even if a fuel tank pressure sensor is degraded.

FIG. 1 illustrates an example vehicle propulsion system 100. Vehicle propulsion system 100 includes a fuel burning engine 10 and a motor 20. As a non-limiting example, engine 10 comprises an internal combustion engine and motor 20 comprises an electric motor. Motor 20 may be configured to utilize or consume a different energy source than engine 10. For example, engine 10 may consume a liquid fuel (e.g. gasoline) to produce an engine output while motor 20 may consume electrical energy to produce a motor output. As such, a vehicle with propulsion system 100 may be referred to as a hybrid electric vehicle (HEV). Specifically, propulsion system 100 is depicted herein as a plug-in hybrid electric vehicle (PHEV).

Vehicle propulsion system 100 may be operated in a variety of different modes depending on vehicle operating conditions. Some of these modes may enable engine 10 to be maintained in an off state (or deactivated state) where combustion of fuel at the engine is discontinued. For example, under select operating conditions, motor 20 may propel the vehicle via drive wheel 32 while engine 10 is deactivated.

During other operating conditions, engine 10 may be deactivated while motor 20 is operated to charge energy storage device 50 via regenerative braking. Therein, motor 20 may receive wheel torque from drive wheel 32 and convert the kinetic energy of the vehicle to electrical energy for storage at energy storage device 50. Thus, motor 20 can provide a generator function in some embodiments. However, in other embodiments, a dedicated energy conversion device, herein generator 60 may instead receive wheel torque from drive wheel 32 and convert the kinetic energy of the vehicle to electrical energy for storage at energy storage device 50.

During still other operating conditions, engine 10 may be operated by combusting fuel received from fuel system 40. For example, engine 10 may be operated to propel the vehicle via drive wheel 32 while motor 20 is deactivated. During other operating conditions, both engine 10 and motor 20 may each be operated to propel the vehicle via drive wheel 32. A configuration where both the engine and the motor may selectively propel the vehicle may be referred to as a parallel type vehicle propulsion system. Note that in some embodiments, motor 20 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 20, which may in turn propel the vehicle via drive wheel 32. For example, during select operating conditions, engine 10 may drive generator 60, which may in turn supply electrical energy to one or more of motor 20 or energy storage device 50. As another example, engine 10 may be operated to drive motor 20 which may in turn provide a generator function to convert the engine output to electrical energy, where the electrical energy may be stored at energy storage device 50 for later use by the motor. The vehicle propulsion system may be configured to transition between two or more of the operating modes described above depending on operating conditions.

Fuel system 40 may include one or more fuel storage tanks 44 for storing fuel on-board the vehicle and for providing fuel to engine 10. For example, fuel tank 44 may store one or more liquid fuels, including but not limited to: gasoline, diesel, and alcohol fuels. In some examples, the fuel may be stored on-board the vehicle as a blend of two or more different fuels. For example, fuel tank 44 may be configured to store a blend of gasoline and ethanol (e.g. E10, E85, etc.) or a blend of gasoline and methanol (e.g. M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle and/or to recharge energy storage device 50 via motor 20 or generator 60.

Fuel tank 44 may include a fuel level sensor 46 for sending a signal regarding a fuel level in the tank to control system (or controller) 12. Fuel level sensor 46 may comprise a float connected to a variable resistor, as shown. Alternatively, other types of fuel level sensors may be used. The level of fuel stored at fuel tank 44 (e.g. as identified by the fuel level sensor) may be communicated to the vehicle operator, for example, via a fuel gauge or indication lamp indicated at 52.

Vehicle system 100 may include a fuel door 62 located on an outer body of the vehicle for receiving fuel from an external fuel source. Fuel door 62 may be held locked during most vehicle operating conditions so as to contain fuel tank vapors and reduce the release of fuel tank hydrocarbons into the environment. Fuel system 40 may periodically receive fuel from the external fuel source. However, since engine 10 is periodically set to a deactivated state (or engine-off mode) where the consumption of fuel at the engine is significantly reduced or discontinued, long durations may elapse between subsequent fuel tank refilling events.

In response to a fuel level in the fuel tank falling below a threshold, as indicated by fuel gauge 52, a fuel tank refill request may be made by a vehicle operator. The operator may indicate a desire to refill fuel tank 44 by actuating refill button 92 positioned on a dashboard 90 of the vehicle system. The vehicle operator may also stop the vehicle for refilling. As elaborated with reference to FIGS. 2-3, in response to the refueling request, it may be determined if there is excess pressure or vacuum in the fuel tank. If so, depressurization of the fuel tank may be performed by relieving the excess pressure/vacuum to the engine intake before the fuel door can be unlocked. As such, fuel tank pressure/vacuum may develop due to diurnal temperature cycles at the engine. Following pressure relief, the fuel door may be unlocked enabling the vehicle operator to fill the fuel tank. Fuel may be pumped into the fuel tank from fuel dispensing device 70 via a refueling line 48 that forms a passageway from fuel door 62. By delaying fuel door unlocking until the fuel tank has depressurized to ambient pressure conditions, the operator may be protected from getting sprayed with a fuel mist when the fuel door is opened. In addition, fuel vapors are not released into the environment improving vehicle emissions.

Vehicle system 100 may include an auxiliary system 64. The auxiliary system may be, for example, a vehicle navigation system (such as a GPS), or an entertainment system (e.g., radio, DVD player, stereo system, etc.). In one example, where auxiliary system is a vehicle navigation system, location and time data may be transmitted between the control system 12 of the vehicle and a global positioning satellite via wireless communication.

In one example, fuel gauge 52, refuel button 92, auxiliary system 64, as well as odometer 54 may be coupled to the vehicle's dashboard 90. For example, the various sensors and gauges may be coupled to a message center (not shown) on the vehicle's dashboard. The message center may include indicator light(s) and/or a text-based display in which messages are displayed to an operator, such as a message requesting an operator input to refill the fuel tank or start the engine. Alternatively, the dashboard may be configured with a touch interactive display for touch and text interaction between the vehicle control system and the vehicle operator.

Control system 12 may communicate with one or more of engine 10, motor 20, fuel system 40, energy storage device 50, and generator 60. Specifically, control system 12 may receive feedback from one or more of engine 10, motor 20, fuel system 40, energy storage device 50, and generator 60 and send control signals to one or more of them in response. Control system 12 may also receive an indication of an operator requested output of the vehicle propulsion system from a vehicle operator 130. For example, control system 12 may receive feedback from pedal position sensor 134 which communicates with pedal 132. Pedal 132 may refer schematically to an accelerator pedal (as shown) or a brake pedal.

Energy storage device 50 may include one or more batteries and/or capacitors. Energy storage device 50 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

Energy storage device 50 may periodically receive electrical energy from an external power source 80 not residing in the vehicle. As a non-limiting example, vehicle propulsion system 100 may be configured as a plug-in hybrid electric vehicle (HEV), whereby electrical energy may be supplied to energy storage device 50 from power source 80 via an electrical energy transmission cable 82. During a recharging operation of energy storage device 50 from power source 80, electrical transmission cable 82 may electrically couple energy storage device 50 and power source 80. While the vehicle propulsion system is operated to propel the vehicle, electrical transmission cable 82 may be disconnected between power source 80 and energy storage device 50. Control system 12 may estimate and/or control the amount of electrical energy stored at the energy storage device, referred to herein as the state of charge (SOC).

In other embodiments, electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging energy storage device 50 from the external power source 80. In this way, motor 20 may propel the vehicle by utilizing an energy source other than the fuel utilized by engine 10.

Figure 2:
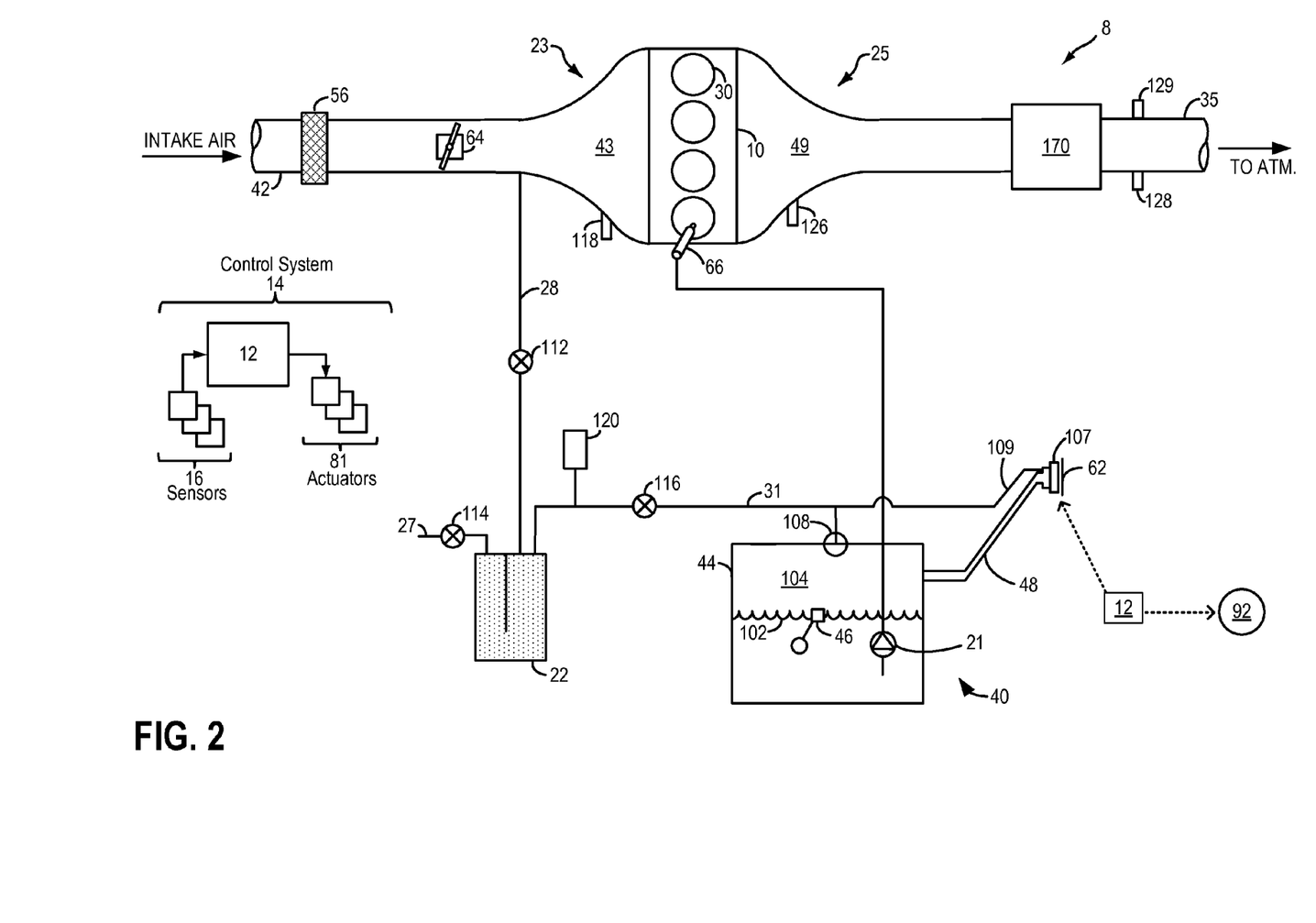
FIG. 2 shows a schematic depiction of an engine system coupled in the vehicle system of FIG. 1.

FIG. 2 shows a schematic depiction of an engine system 8 coupled in a hybrid vehicle system, such as vehicle system 100 of FIG. 1. As such, vehicle and engine components previously introduced in FIG. 1 are numbered similarly in FIG. 2 and not reintroduced.

Engine system 8 may include an engine 10 (such as engine 10 of FIG. 1) having a plurality of cylinders 30. Engine 10 includes an engine intake 23 and an engine exhaust 25. Engine intake 23 includes an air intake throttle 64 fluidly coupled to the engine intake manifold 43 via an intake passage 42. Air may enter intake passage 42 via air filter 56. Engine exhaust 25 includes an exhaust manifold 49 leading to an exhaust passage 35 that routes exhaust gas to the atmosphere. Engine exhaust 25 may include one or more emission control devices 170 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown), having an intake compressor driven by an exhaust turbine.

Engine system 8 is coupled to fuel system 40. Fuel system 40 includes a fuel tank 44 coupled to a fuel pump 21 and a fuel vapor canister 22. Fuel tank 44 receives fuel via a refueling line 48, which acts as a passageway between the fuel tank 44 and a refueling door 62 on an outer body of the vehicle. During a fuel tank refueling event, fuel may be pumped into the vehicle from an external source through refueling inlet 107 which is normally covered by a gas cap. During a refueling event, while fuel is pumped into fuel tank 44, one or more fuel tank vent valves may be opened to allow refueling vapors to be directed to, and stored in, canister 22.

Fuel pump 21 is configured to pressurize fuel delivered to the injectors of engine 10, such as example injector 66. While only a single injector 66 is shown, additional injectors are provided for each cylinder. It will be appreciated that fuel system 40 may be a return-less fuel system, a return fuel system, or various other types of fuel system.

In some embodiments, engine 10 may be configured for selective deactivation. For example, engine 10 may be selectively deactivatable responsive to idle-stop conditions. Therein, responsive to any or all of idle-stop conditions being met, the engine may be selectively deactivated by deactivating cylinder fuel injectors. As such, idle-stop conditions may be considered met if the engine is combusting while a system battery (or energy storage device) is sufficiently charged, if auxiliary engine loads (e.g., air conditioning requests) are low, engine temperatures (intake temperature, catalyst temperature, coolant temperature, etc.) are within selected temperature ranges where further regulation is not required, and a driver requested torque or power demand is sufficiently low. In response to idle-stop conditions being met, the engine may be selectively and automatically deactivated via deactivation of fuel and spark. The engine may then start to spin to rest. Further, as elaborated herein, during conditions when fuel tank vacuum is elevated, the engine may be actively pulled-down, or deactivated, so as to enable the fuel tank vacuum to be vented to the deactivated engine.

Vapors generated in fuel tank 44 may be routed to fuel vapor canister 22, via conduit 31, before being purged to engine intake 23. Fuel tank 44 may include one or more vent valves for venting diurnals and refueling vapors generated in the fuel tank to fuel vapor canister 22. The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). In the depicted example, fuel tank 44 includes a passive fuel level vent valve (FLVV) 108 that includes a float mechanism which, when displaced by fuel, shuts off the vapor flow between the fuel tank and the canister. Thus, based on a fuel level 102 relative to vapor space 104 in the fuel tank, the vent valve may be open or closed. For example, FLVV 108 may be normally open allowing fuel tank overfilling to be prevented. In particular, during fuel tank refilling, when a fuel level 102 is raised, vent valve 108 may close, causing pressure to build in vapor line 109 (which is downstream of refueling inlet 107 and coupled thereon to conduit 31) as well as at a filler nozzle coupled to the fuel pump. The increase in pressure at the filler nozzle may then trip the refueling pump, stopping the fuel fill process automatically, and preventing overfilling.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23, specifically intake manifold 44, via purge line 28 by opening canister purge valve 112. While a single canister 22 is shown, it will be appreciated that fuel system 18 may include any number of canisters.

Canister 22 further includes a vent 27 (herein also referred to as a fresh air line) for routing gases out of the canister 22 to the atmosphere when storing, or trapping, fuel vapors from fuel tank 44. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. By closing canister vent valve 114, the fuel tank may be isolated from the atmosphere. As elaborated below and with reference to FIG. 3, during refueling conditions, prior to unlocking fuel door 62, the canister vent valve may be closed to seal the fuel system while the canister purge valve is opened to direct fuel tank vapors to the intake manifold, thereby providing fuel tank pressure relief. By monitoring the flow of air and/or vapors at the intake via an engine MAF sensor, depressurization of the fuel tank may be inferred and the unlocking of the fuel door may be adjusted accordingly.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, in some embodiments, a fuel tank isolation valve (FTIV) 116 may be optionally included in conduit 31 such that fuel tank 44 is coupled to canister 22 via FTIV 116. When included, the isolation valve may be kept closed during engine operation so as to limit the amount of diurnal vapors directed to canister 22 from fuel tank 44. During refueling operations, and selected purging conditions, the isolation valve may be temporarily opened to direct fuel vapors from the fuel tank 44 to canister 22. By opening the valve when the fuel tank pressure is higher than a threshold (e.g., above a mechanical pressure limit of the fuel tank above which the fuel tank and other fuel system components may incur mechanical damage), the fuel tank vapors may be released into the canister and the fuel tank pressure may be maintained below pressure limits.

One or more pressure sensors 120 may be coupled to fuel system 40 for providing an estimate of a fuel system pressure. In one example, the fuel system pressure is a fuel tank pressure, wherein pressure sensor 120 is a fuel tank pressure sensor (or fuel tank pressure transducer FTPT) coupled to fuel tank 44 for estimating a fuel tank pressure or vacuum level. While the depicted example shows pressure sensor 120 coupled between fuel tank 44 and canister 22, in alternate embodiments, the pressure sensor may be directly coupled to fuel tank 44.

A vehicle operator may indicate a refueling request (or desire to refill fuel tank 44) to the vehicle controller 12 via the actuation of a refuel button 92 located on a vehicle dashboard. Based on the refueling input from refuel button 92, and further based on a fuel tank pressure estimate, controller 12 may determine whether to unlock fuel door 62 immediately or delay the unlocking. As such, during all conditions other than refueling, fuel door 62 may be held locked so as to contain fuel vapors in the fuel tank and reduce the release of hydrocarbons into the atmosphere. Given that fuel tank 44 is part of a sealed fuel system, due to diurnal temperature cycles of the engine and vehicle, there may be fluctuations in the fuel tank pressure. For example, based on ambient temperatures experienced and vehicle operating conditions, excess fuel tank pressure or excess fuel tank vacuum conditions may occur. Prior to enabling refilling of the tank, fuel tank depressurization may be necessary. Else, when the vehicle operator opens the refuel door and tank cap, fuel mist may be sprayed on the operator. In addition, hydrocarbon emissions from the vehicle are increased. As such, the output of pressure sensor 120 may provide an indication of fuel tank pressurization. For example, if a fuel tank pressure level (or vacuum level) is higher than a threshold, it may be determined that the fuel tank needs to be depressurized. However, there may be conditions when the FTPT is degraded. For example, the FTPT may have gone bad or may be stuck in a range. In either case, there is a danger that the FTPT may indicate normal fuel tank pressure conditions when there is actually excess fuel tank pressure conditions. In such an event, the engine controller may not have an actual estimate of the pressure magnitude in the tank and may enable unlocking of the fuel door prematurely, or disable unlocking of the fuel door indefinitely.

The inventors herein have therefore identified an alternate (e.g., back-up or secondary) approach for reliably verifying fuel tank depressurization. In response to the operator's refueling request, the fuel system may be sealed and fuel tank vapors may be diverted to the engine intake manifold. Specifically, canister vent valve 114 may be closed while each of canister purge valve 112 and FTIV 116 are opened. Throttle 64 may also be concurrently opened. As a result of the valve adjustments, the fuel tank may start to depressurize with excess fuel tank pressure or vacuum being directed along purge line 28 into the intake manifold. As such, until the fuel tank depressurizes, air or vapors may continue to flow from the fuel tank into the intake manifold and this flow may be sensed by intake manifold MAF sensor 118. Thus, based on a response from the MAF sensor, or an output of the MAF sensor being higher than a threshold, the controller may determine that depressurization is in process and may hold the fuel door locked. Then, based on no response from the MAF sensor, or an output of the MAF sensor being lower than the threshold, the controller may determine that depressurization is complete and fuel tank pressure has stabilized to a safe level. Accordingly, the fuel door may be unlocked to allow the vehicle operator to refill the fuel tank. In this way, reliable depressurization information is received during refueling even if the FTPT is degraded. In addition, as elaborated at FIG. 3, based on the output of the MAF sensor relative to that of the FTPT, degradation of the FTPT may be determined. For example, if the FTPT indicates stable fuel tank pressure while the MAF sensor detects flow of air or vapors to the intake manifold, it may be determined than the FTPT is degraded and only MAF sensor data may be used for determining when to unlock the fuel door.

Fuel vapors released from canister 22 during a purging operation may be directed into engine intake manifold 43 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold air flow (MAF) may be obtained from MAF sensor 118 coupled to intake manifold 43, and communicated with controller 12. Alternatively, MAF may be inferred from alternate engine operating conditions, such as mass air pressure (MAP), as measured by a MAP sensor (not shown) coupled to the intake manifold.

Fuel system 40 may be operated by controller 12 in a plurality of modes by selective adjustment of the various valves and solenoids. For example, the fuel system may be operated in a fuel vapor storage mode wherein the controller 12 may close canister purge valve (CPV) 112 and open canister vent valve 114 and FTIV 116 to direct refueling and diurnal vapors into canister 22 while preventing fuel vapors from being directed into the intake manifold.

As another example, the fuel system may be operated in a refueling mode (e.g., when fuel tank refueling is requested by a vehicle operator), wherein the controller 12 may adjust the valves to depressurize the fuel tank before enabling fuel to be added therein. Therein the controller 12 may close CVV 114 and open each of CPV 112 and FTIV 116 to direct excess fuel tank pressure/vacuum into the intake manifold via the canister.

As yet another example, the fuel system may be operated in a canister purging mode (e.g., after an emission control device light-off temperature has been attained and with the engine running), wherein the controller 12 may open canister purge valve 112, canister vent valve 114, and close FTIV 116. By closing the FTIV, the canister can be purged more efficiently during the limited engine-on time that is available in a hybrid vehicle. During this mode, vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas (air/fuel ratio) sensor 126 located upstream of the emission control device, exhaust temperature sensor 128, MAF sensor 118, and exhaust pressure sensor 129. Other sensors such as additional pressure, temperature, air/fuel ratio, and composition sensors may be coupled to various locations in the vehicle system 6. As another example, the actuators may include fuel injector 66, canister purge valve 112, canister vent valve 114, FTIV 116, and throttle 64. The control system 14 may include a controller 12. The controller may receive input data from the various sensors, process the input data, and trigger the actuators in response to the processed input data based on instruction or code programmed therein corresponding to one or more routines. An example control routine is described herein with regard to FIG. 3.

In this way, the systems of FIGS. 1-2 enable a method for depressurizing a fuel tank prior to refueling. Specifically, during refueling conditions, the method includes directing fuel tank vapors to an engine intake manifold, and indicating depressurization of a fuel tank based on the output of a mass air flow sensor coupled to the intake manifold. The systems further enable degradation of a fuel tank pressure sensor to be indicated based on the output of the mass air flow sensor.

Now turning to FIG. 3, an example routine 300 is shown for venting excess fuel tank pressure or vacuum to an engine intake in a hybrid vehicle system prior to unlocking a fuel door during a refueling operation. The method uses an FTPT and a MAF sensor for inferring fuel tank pressure so that reliability of a depressurization operation is increased.

At 302, refueling conditions may be confirmed. Refueling conditions may include an operator request for refueling being received via operator actuation of a refueling button on a dashboard of the hybrid vehicle. If no operator request for refueling is received, the routine may end.

At 304, upon receiving the operator refuel request and confirming refueling conditions, the routine includes estimating a fuel tank pressure and comparing it to a threshold. For example, the fuel tank pressure may be estimated by a fuel tank pressure sensor or transducer coupled to the fuel tank and it may be determined if the pressure estimated by the pressure sensor is higher than a first threshold (Thr 1). Herein, the threshold may correspond to a pressure level above which excess fuel tank pressure may be confirmed and depressurization of the fuel tank may be required prior to enabling refueling. In one example, the first threshold may be based on the configuration of the fuel tank, such as the size of the fuel tank. For example, the first threshold may be increased as the size of the fuel tank increases. The threshold may be further based on the fuel level in the fuel tank. For example, the first threshold may be increased as the fuel level in the fuel tank increases.

As such, there may be conditions where the fuel tank pressure sensor is degraded and even though the fuel tank pressure is not elevated, due to the sensor being stuck in a (high) range, fuel tank over-pressure conditions may be indicated. In this case, the controller may hold a fuel door locked indefinitely, making the operator unable to refill the fuel tank. Likewise, there may be conditions where the fuel tank sensor is degraded and even though the fuel tank pressure is elevated, due to the sensor malfunctioning or the sensor being stuck in a (low) range, normal fuel tank pressure conditions may be indicated. In this case, the controller may prematurely unlock the fuel door causing elevated hydrocarbons emissions into the air and possibly spraying fuel mist onto the vehicle operator when the fuel cap is removed for refueling.

As a safeguard against these possibilities, a back-up or secondary depressurization confirmation approach is used that is based on the detection of fuel vapor or air flow to an engine intake manifold. In particular, if the fuel tank pressure (positive or negative pressure) is higher than the first threshold, the routine proceeds to 306 to close a first valve (the canister vent valve, CVV, coupling the fuel tank to the atmosphere) to seal the fuel system from the atmosphere. At 308, the routine includes directing fuel tank vapors from the sealed fuel system to the engine intake manifold to relieve excess pressure (or vacuum) build-up in the fuel tank. Specifically, the controller may open each of a second fuel tank isolation valve (FTIV) coupled between the fuel tank and a fuel system canister, and a third canister purge valve (CPV) coupled between the canister and the intake manifold. Simultaneously, the controller may also open the intake throttle. In doing so, the only route available for pressure release from the fuel tank is into the intake manifold, via the canister and the throttle. The throttle should be ideally opened wide to minimize depressurization time. However, if NVH issues (e.g., whistling noise) or power consumption factor in, the throttle may be opened partially or part-way. That is, an opening of the intake throttle may be based on depressurization time (available versus required). For example, as the depressurization time available decreases, the opening of the throttle may be increased to expedite the depressurization. Alternatively, the throttle may be fully opened to minimize depressurization time. The throttle opening may also be adjusted as a function of the starting fuel tank pressure. For example, as the starting fuel tank pressure decreases, the throttle opening may be increased.

Based on whether the pressure build-up in the fuel tank was a positive pressure build-up from excess fuel tank vapors, or a negative pressure build-up from excess fuel tank vacuum, vapors or air may flow, respectively, from the fuel tank to the intake manifold. The flow of the vapors or air may be sensed by a mass air flow (MAF) sensor coupled downstream of the throttle in the intake manifold. Specifically, as the fuel tank depressurizes, air or vapors may continue to flow to the intake manifold, and the MAF sensor may respond to the flow by producing a corresponding sensor output. Then, when the fuel tank has depressurized and stabilized to ambient pressure conditions, air or vapors may stop flowing to the intake manifold, and the MAF sensor may stop responding. In this way, depressurization of the fuel tank may be indicated based on the output of the mass air flow sensor.

Returning to the routine, at 310, the MAF sensor output may be monitored. At 312, it may be determined if the output of the MAF sensor is higher than a second threshold (Thr_2). The second threshold may be related to, or based on the first threshold and should be at or near zero flow. That is, only when the MAF sensor indicates zero flow is the system determined to be depressurized. At 322, the routine includes indicating fuel tank depressurization is not complete in response to the MAF sensor output being higher than the threshold. In addition, in response to the indication that depressurization is not complete, the routine includes holding a fuel door coupled to the fuel tank locked to disable refueling. As such, the fuel door may be held locked and unlocking may be delayed until sufficient fuel tank depressurization is confirmed.

If the MAF sensor output is less than the (second) threshold, the routine may optionally proceed to 316 to also verify that the fuel tank pressure sensor is also indicating a drop in fuel tank pressure. For example, it may be verified if the output of the fuel tank pressure sensor is below the first threshold. If there is a discrepancy between the outputs of the fuel tank pressure sensor (FTPT) and the MAF sensor, at 317, degradation of the FTPT may be indicated by setting a diagnostic code. In addition, since the MAF sensor output is lower than Thr_2, indicating depressurization is complete, the routine may proceed to 324 after the diagnostic code to confirm that the fuel system has depressurized.

If at 316 the fuel tank pressure sensor also indicates a drop in fuel tank pressure (that is, confirms the completion of depressurization, as initially confirmed by the MAF sensor output), the routine proceeds to 324 wherein it may be indicated that fuel tank depressurization is complete. Alternatively, the routine may go to 324 directly from 312 and indicate that fuel tank depressurization is complete in response to the MAF sensor output being less than the (second) threshold. Further, in response to the indication that the depressurization of the fuel tank is complete, the fuel door may be unlocked to enable refueling. The vehicle operator may then open a fuel cap and refill fuel from an external fuel source into the fuel tank.

Returning to 304, even if the fuel tank pressure (positive or negative pressure) is lower than the first threshold, as a safeguard against the possibility of pressure sensor degradation, the auxiliary MAF sensor based approach may be used to confirm that the fuel tank does not have excess fuel tank pressure or vacuum. Specifically, at 316, as at 306-308, the routine proceeds to seal the fuel system and direct excess fuel tank pressure/vacuum to the engine intake manifold by opening each of the isolation valve, the purge valve, and the intake throttle while closing the vent valve.

At 318, as at 312, it may be determined if the MAF sensor output is higher than the (second) threshold. If both the fuel tank pressure sensor and MAF sensor outputs are below their respective thresholds, it may be confirmed that the fuel tank pressure is stable and that there is no excess pressure or vacuum in the fuel tank. Accordingly, it may be determined that refueling can be safely performed and at 324, the fuel door may be unlocked to enable the vehicle operator to refill the tank. If the fuel tank pressure sensor and the MAF sensor outputs do not correlate, then at 320, as at 317, degradation of the fuel tank pressure sensor may be determined and the same may be indicated to a vehicle operator by setting a diagnostic code. For example, a malfunction indication light may be illuminated on the vehicle dashboard.

As such, based on the discrepancy, the nature of fuel tank pressure sensor degradation indicated may vary. For example, in response to the output of the fuel tank pressure sensor being lower than the first threshold (suggesting normal fuel tank pressure) while the output of the mass air flow sensor is higher than the second threshold (suggesting elevated fuel tank pressure), such as at 320, the controller may indicate degradation of the fuel tank pressure sensor such as a fault where the fuel tank pressure sensor is not functional or stuck in a low range. In comparison, in response to the output of the fuel tank pressure sensor being higher than the first threshold (suggesting elevated fuel tank pressure) while the output of the mass air flow sensor is lower than the second threshold (suggesting normal fuel tank pressure), such as at 317, the controller may indicate degradation of the fuel tank pressure sensor such as a fault where the fuel tank pressure sensor is stuck in a high range.

It will be appreciated that while the routine of FIG. 3 uses the output of the MAF sensor to learn degradation of the FTPT, in still other embodiments, a comparison of the outputs of the MAF sensor and the FTPT may be used to learn MAF sensor degradation. For example, if the fuel tank pressure estimated by the FTPT (e.g., P_fueltank at 304) starts out high and goes to atmosphere upon depressurization but the MAF sensor output remains higher than the second threshold (Thr_2), indicating flow through the engine, then it may be determined that the MAF sensor is degraded and an appropriate diagnostic code may be set.

Further still, during conditions when there is a double failure or degradation of both the FTPT and the MAF sensor, an "ERROR" message may be displayed on the vehicle dashboard upon a refueling request. For example, if neither the FTPT nor the MAF sensor outputs can determine if the fuel system has depressurized (e.g., the FTPT output remains above the threshold and the MAF sensor output remains above the threshold after a prolonged duration of depressurization), a diagnostic code indicating the double degradation may be set and a MIL may be illuminated on the dashboard when the vehicle operator requests refueling. At this point, the vehicle owner's manual may instruct the vehicle operator to refuel the vehicle system using a manual override. For example, the vehicle operator may be instructed to pull the cord of a T-handle in the vehicle trunk to manually unlock the fuel door.

It will be further appreciated that while the routine of FIG. 3 infers depressurization and air/vapor flow from a fuel tank to an intake manifold during refueling conditions based on the output of a MAF sensor relative to a threshold, in alternate examples, depressurization may be inferred based on a rate of change in the output of the MAF sensor. Therein, it may be inferred that depressurization is ongoing based on the rate of change in the output of the MAF sensor being higher than a threshold while it may be inferred that depressurization is complete and fuel tank pressure has stabilized based on the rate of change in the output of the MAF sensor being lower than the threshold.

In a still further example, depressurization may be inferred based on the presence or absence of an output from the MAF sensor (that is, based on MAF sensor responsiveness). For example, if the MAF sensor responds following the adjustment to the fuel system valves, and any sensor output is generated, it may be inferred that there is some flow from the fuel tank to the intake manifold and that depressurization is ongoing. In comparison, if the MAF sensor does not respond following the adjustment to the fuel system valves, and no sensor output is generated, it may be inferred that there is no flow from the fuel tank to the intake manifold and that depressurization has been completed and that the fuel tank pressure is stable and safe for refueling.

In this way, the output of an existing MAF sensor can be advantageously used during refueling conditions to gauge fuel tank pressure conditions and determine if a fuel door can be unlocked or not. In addition to a fuel tank pressure estimate, by opening a purge valve and isolation valve between the fuel tank and the engine, and inferring fuel tank overpressure (elevated pressure or elevated vacuum) conditions based on the presence of flow (of air or tank vapors) from a sealed fuel tank to the intake manifold, fuel tank depressurization may be confirmed with higher reliability. Furthermore, fuel tank depressurization may be determined even if the fuel tank pressure sensor is not functioning.

In one example, a hybrid vehicle system comprises an engine coupled to vehicle drive wheels, the engine including an intake, a throttle coupled to the intake, a MAF sensor coupled to the intake downstream of the throttle and an electric motor coupled to the vehicle drive wheels. The vehicle system may further include a fuel system coupled to the engine including a fuel tank, a canister, a fuel door, a first valve coupling the fuel tank to atmosphere, a second valve coupling the fuel tank to the canister, a third valve coupling the canister to the intake, and a pressure sensor coupled to the fuel tank. A refuel button may be provided on a vehicle dashboard for receiving an operator request for refueling. A vehicle controller may be configured with computer readable instructions for, in response to the operator request for refueling, delaying unlocking of the fuel door until an indication of fuel tank depressurization being completed is received, the indication based on an output of the MAF sensor. As used herein, the delaying may include holding the fuel door locked until a change in the output (or absolute value of the output) of the MAF sensor is lower than a threshold. The delaying may further include, while holding the fuel door locked, closing the first valve and opening each of the second valve, the third valve and the throttle to relieve fuel tank pressure to the engine intake. A degree of opening of the intake throttle during the delaying may be based on depressurization time and/or starting fuel tank pressure. The controller may unlock the fuel door to enable refilling only after the change in the output (or absolute value of the output) of the MAF sensor is lower than the threshold.

The controller may also compare a change in the output of the pressure sensor during the delaying with the change in the output of the MAF sensor during the delaying, and in response to a difference between the change in the output of the pressure sensor and the change in the output of the MAF sensor, indicate pressure sensor degradation.

Now turning to FIG. 4, map 400 depicts an example fuel tank depressurization operation following a refueling request in a hybrid vehicle system. Map 400 depicts the locking/unlocking of a fuel door coupled to the fuel tank at plot 402, opening/closing of a fuel system CPV at plot 404, opening/closing of a fuel system CVV at plot 406, opening/closing of a fuel system FTIV at plot 408, opening of an intake throttle at plot 410, fuel tank pressure at plot 412, and the output of a MAF sensor coupled downstream of the throttle in the engine intake manifold at plot 414.

Prior to t1, the vehicle may be operating in an engine mode or electric mode with various diurnal cycle temperatures. During the vehicle operation, a fuel system purge valve (CPV) and isolation valve (FTIV) may be held closed (plots 404, 408) to contain diurnal fuel tank vapors in the fuel tank. As a result, prior to t1, an elevated fuel tank pressure condition may be present (plot 412). For example, the fuel tank pressure may be 88 in $H_2O$. As such, prior to t1, a throttle opening degree (plot 410) and MAF (plot 414) may be based on engine operating conditions. In addition, the vehicle may be operated with the fuel door closed to reduce fuel vapor emissions to the atmosphere.

At t1, an operator request for refueling may be received. Specifically, an operator may request refueling by pressing a refuel button on the vehicle dashboard. Due to the presence of elevated fuel tank pressure, tank depressurization may be required prior to unlocking the fuel door and enabling refueling. Specifically, in response to the operator request for refueling, at t1, the controller may close a first valve (the CVV, plot 406) to seal the fuel system from atmosphere while opening each of a second valve (the CPV, plot 404) and a third valve (the FTIV, plot 408) coupling the fuel tank to an engine intake manifold to divert the fuel tank vapors to the intake manifold. The controller may also simultaneously increase an opening of the intake throttle (plot 410).

In response to the adjustment of the fuel system valves, the excess fuel tank pressure may be directed into the intake manifold via the canister. As fuel vapors flow past the throttle into the intake manifold, the flow is detected by an intake MAF sensor. Thus, as fuel vapors enter from the fuel tank into the intake, a fuel tank pressure may decrease (plot 412) enabling fuel tank pressure relief. At the same time, a corresponding increase in mass air flow may be detected at the MAF sensor (plot 414). In other words, depressurization of the fuel tank may be inferred based on the change in fuel tank pressure and/or based on the change in the output of the intake manifold mass air flow sensor.

In the depicted example, fuel tank depressurization being in process is indicated based on a transient change or flux in MAF between t1 and t2. Shortly before t2, fuel tank pressures may stabilize at or near ambient temperatures. As the fuel tank pressure stabilizes, flow through the MAF sensor may also reduce and the sensor output may correspondingly also stabilize. Thus, at t2, in response to stabilization of the MAF sensor output, it may be inferred that fuel tank depressurization has occurred and that it is safe to unlock the fuel door. Accordingly, at t2, the fuel door may be unlocked and the vehicle operator may be able to refill the fuel tank.

In other examples, in response to an output from the mass air flow sensor being higher than a first threshold, it may be indicated that the depressurization is in process, while indicating fuel tank depressurization is complete in response to the output from the mass air flow sensor being lower than the first threshold.

It will be appreciated that a controller may also concurrently receive a fuel tank pressure estimate from a pressure sensor coupled to the fuel tank, and indicate degradation of the pressure sensor based on the fuel tank pressure estimate relative to the output of the mass air flow sensor. For example, degradation of the pressure sensor may be indicated if the fuel tank pressure estimate is lower than a second threshold when the output of the mass air flow sensor is higher than the first threshold, or the fuel tank pressure estimate is higher than the second threshold when the output of the mass air flow sensor is lower than the first threshold Thus, based on differences between the output of the fuel tank pressure sensor and the output of the MAF sensor, degradation of the fuel tank pressure sensor may be determined.

In this way, an existing MAF sensor may be advantageously used in a secondary, back-up method to confirm fuel tank pressurization during a refueling event. By opening a canister purge valve, fuel tank pressure can be selectively relieved from a sealed fuel system into an engine intake manifold while the flow of fuel tank vapors into the intake manifold is sensed by the MAF sensor. By using existing engine hardware to confirm fuel tank depressurization, component reduction benefits are achieved while increasing the reliability of depressurization data. In addition, depressurization can be confirmed even when a fuel tank pressure sensor is degraded. By delaying unlocking of the fuel door until fuel tank pressure stabilization is confirmed, the release of fuel tank hydrocarbons into the air is reduced. In addition, the vehicle operator may be protected from fuel spray.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle, comprising:
   in response to an operator request for refueling,
   closing a vent valve to seal a fuel system from atmosphere;
   directing fuel tank vapors from the sealed fuel system to an engine intake manifold; and
   indicating depressurization of a fuel tank based on output of a mass air flow sensor.

2. The method of claim 1, wherein the directing includes opening each of an isolation valve coupled between the fuel tank and a canister, a purge valve coupled between the canister and the intake manifold, and an intake throttle, while maintaining the vent valve coupling the fuel tank to atmosphere closed.

3. The method of claim 2, wherein the indicating includes indicating fuel tank depressurization is not complete in response to the mass air flow sensor output being higher than a threshold and indicating fuel tank depressurization is complete in response to the mass air flow sensor output being lower than the threshold.

4. The method of claim 3, further comprising, in response to the indication that depressurization is not complete, holding a fuel door coupled to the fuel tank locked to disable refueling.

5. The method of claim 4, further comprising, in response to the indication that the depressurization is complete, unlocking the fuel door to enable refueling.

6. The method of claim 2, further comprising, indicating degradation of a fuel tank pressure sensor based on the output of the mass air flow sensor by setting a diagnostic code.

7. The method of claim 6, wherein the indicating includes, in response to an output of a fuel tank pressure sensor being lower than a first threshold while the output of the mass air flow sensor is higher than a second threshold, indicating degradation of the fuel tank pressure sensor, the second threshold related to the first threshold.

8. The method of claim 1, wherein the refueling conditions include an operator request for refueling being received via operator actuation of a refueling button on a dashboard of the hybrid vehicle.

9. A method for a hybrid vehicle fuel system including a fuel tank, comprising:
in response to an operator request for refueling,
closing a first valve to seal the fuel tank from atmosphere;
opening each of a second and third valve coupling the fuel tank to an engine intake manifold;
opening an intake throttle; and
indicating depressurization of a fuel tank based on an intake manifold mass air flow sensor.

10. The method of claim 9, wherein the operator request for refueling includes operator actuation of a refueling button on a dashboard of a vehicle.

11. The method of claim 10, wherein the first valve is a vent valve coupling the fuel tank to the atmosphere, wherein the second valve is an isolation valve coupling the fuel tank to a fuel system canister and wherein the third valve is a purge valve coupling the canister to the intake manifold.

12. The method of claim 11, wherein the indicating includes indicating fuel tank depressurization is in process in response to an output from the mass air flow sensor being higher than a first threshold, and indicating fuel tank depressurization is complete in response to the output from the mass air flow sensor being lower than the first threshold.

13. The method of claim 12, further comprising receiving a fuel tank pressure estimate from a pressure sensor coupled to the fuel tank, and indicating degradation of the pressure sensor based on the fuel tank pressure estimate relative to the output of the mass air flow sensor.

14. The method of claim 13, wherein the indicating includes indicating degradation of the pressure sensor if the fuel tank pressure estimate is lower than a second threshold when the output of the mass air flow sensor is higher than the first threshold, or the fuel tank pressure estimate is higher than the second threshold when the output of the mass air flow sensor is lower than the first threshold.

15. A hybrid vehicle system, comprising:
an engine coupled to vehicle drive wheels, the engine including an intake;
a throttle coupled to the intake;
a MAF sensor coupled to the intake downstream of the throttle;
an electric motor coupled to the vehicle drive wheels;
a fuel system coupled to the engine including a fuel tank, a canister, a fuel door, a first valve coupling the fuel tank to atmosphere, a second valve coupling the fuel tank to the canister, a third valve coupling the canister to the intake, and a pressure sensor coupled to the fuel tank;
a refuel button on a vehicle dashboard for receiving an operator request for refueling; and
a controller with computer readable instructions for,
in response to the operator request for refueling,
delaying unlocking of the fuel door until an indication of fuel tank depressurization being completed is received, the indication based on an output of the MAF sensor.

16. The system of claim 15, wherein the delaying includes holding the fuel door locked until a change in the output of the MAF sensor is lower than a threshold.

17. The system of claim 16, wherein the delaying further includes, while holding the fuel door locked, closing the first valve and opening each of the second valve, the third valve and the throttle to relieve fuel tank pressure to the engine intake.

18. The system of claim 17, wherein the controller includes further instructions for unlocking the fuel door after the change in the output of the MAF sensor is lower than the threshold to enable refilling.

19. The system of claim 18, wherein the controller includes further instructions for comparing a change in the output of the pressure sensor during the delaying with the change in the output of the MAF sensor during the delaying, and in response to a difference between the change in the output of the pressure sensor and the change in the output of the MAF sensor, indicating pressure sensor degradation.

20. The system of claim 19, wherein the controller includes further instructions for adjusting a degree of opening of the intake throttle during the delaying based on one or more of a depressurization time and a fuel tank pressure at a starting of the depressurization.

* * * * *